United States Patent [19]

Chen

[11] Patent Number: 5,175,478
[45] Date of Patent: Dec. 29, 1992

[54] ELECTRICALLY OPERATED DRIVING SHAFT CONTROL DEVICE FOR A WINDOW BLIND

[76] Inventor: Waller Chen, 5F, No. 56, Chin-Chiang St., Taipei City, Taiwan

[21] Appl. No.: 764,726

[22] Filed: Sep. 24, 1991

[51] Int. Cl.⁵ .......................... E06B 9/26; A47H 5/00
[52] U.S. Cl. ........................................ 318/6; 318/14; 318/264; 49/349; 160/DIG. 17
[58] Field of Search ................ 318/2, 6, 9, 14, 15, 318/256, 264, 265, 266, 286; 49/82, 83, 84, 85, 86, 349, 352; 160/166.1, 169, 172, DIG. 17

[56] References Cited

U.S. PATENT DOCUMENTS

| | | | |
|---|---|---|---|
| 4,096,903 | 6/1978 | Ringle, III | 160/176 R |
| 4,281,320 | 7/1981 | Rosenberg | 340/545 |
| 4,417,185 | 11/1983 | Bullat | 318/2 |
| 4,902,953 | 2/1990 | Kraft et al. | 318/663 |
| 4,914,360 | 4/1990 | Hsieh et al. | 318/16 |
| 4,956,588 | 9/1990 | Ming | 318/16 |

Primary Examiner—Bentsu Ro
Attorney, Agent, or Firm—Knobbe, Martens, Olson & Bear

[57] ABSTRACT

An electrically operated driving shaft control device includes a casing having a driving shaft vertically journalled therein and a driving means for rotating it. A movable plate member has a first end with an upward projecting plate and a bearing seat with two first oval-shaped openings on both sides. A second plate provided on the movable plate has a first end distal from the projecting plate and a second end fixed in the casing. The second plate has a second oval-shaped opening and two threaded hole on both sides of the oval-shaped opening. The driving shaft has one end connected to the driving means and another end passing through the bearing seat of the movable plate member and the second oval-shaped opening of the second plate. A guiding roller is fixed to the driving shaft on the second plate. A rope encircles the guiding roller and connects to a blind. A means for breaking an electric circuit when a predetermined tension of the rope is reached during rotation of the driving shaft.

1 Claim, 7 Drawing Sheets

ELECTRICALLY OPERATED DRIVING SHAFT CONTROL DEVICE FOR A WINDOW BLIND

BACKGROUND OF THE INVENTION

1. Field of the Invention

This invention relates to a driving shaft control device, more particularly to an electrically operated driving shaft control device for a window blind.

2. Description of the Related Art

In a conventional electrically operated driving shaft, an A/C motor is used to drive the shaft thereby to raise or lower a blind. It is found that an A/C motor occupies a lot of space therefore not easy to install in a tall building. It is also known that the A/C motor costs more in comparison to a D/C motor, therefore a driving shaft control device for a blind that includes an A/C motor will cost more accordingly when manufacture.

SUMMARY OF THE INVENTION

It is therefore a main object of the present invention to provide, highly desirous from an economic point of view, to provide an electrically operated driving shaft control device for a window blind which is clear of the above-mentioned drawbacks.

Accordingly, an electrically operated driving shaft control device for a window blind of the present invention includes a support member having said driving shaft vertically journalled therein, and means for rotating said driving shaft. A movable plate member has a first end with an upward projecting plate and a bearing seat with two first oval-shaped openings on both sides. A second plate provided on the movable plate member and has a first end distal from the projecting plate and a second fixed in the casing. The second plate has a second oval-shaped opening and two threaded holes on both sides of the second oval-shaped opening. The driving shaft has one end connected to the driving means and another end passing through the bearing seat of the movable plate member and the second oval-shaped opening of the second plate member. A guiding roller is fixed to the driving shaft on the second plate. A rope encircles the guiding roller and connects to a blind. There is also a means for breaking an electric circuit when a predetermined tension of the rope is reached during the rotation of the driving shaft.

BRIEF DESCRIPTION OF THE DRAWINGS

Other features and advantages of the present invention will become more apparent in the following detailed description, including drawings, all of which show non-limiting forms of the invention, and of which.

DETAILED DESCRIPTION OF THE PREFERRED EMBODIMENT

Figure 1:
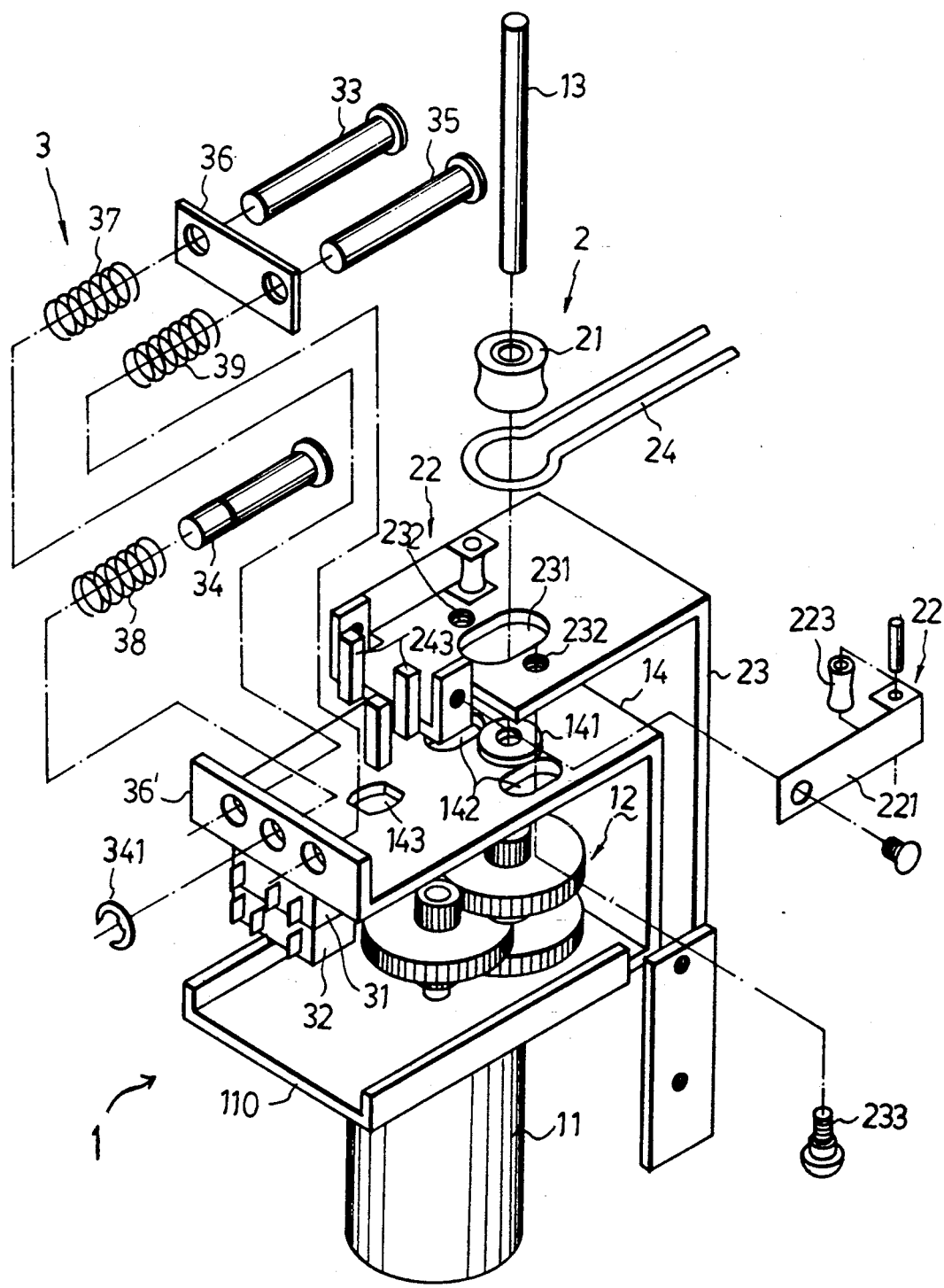
FIG. 1 is an exploded view of an electrically operated driving shaft control device of the present invention.
Figure 2:
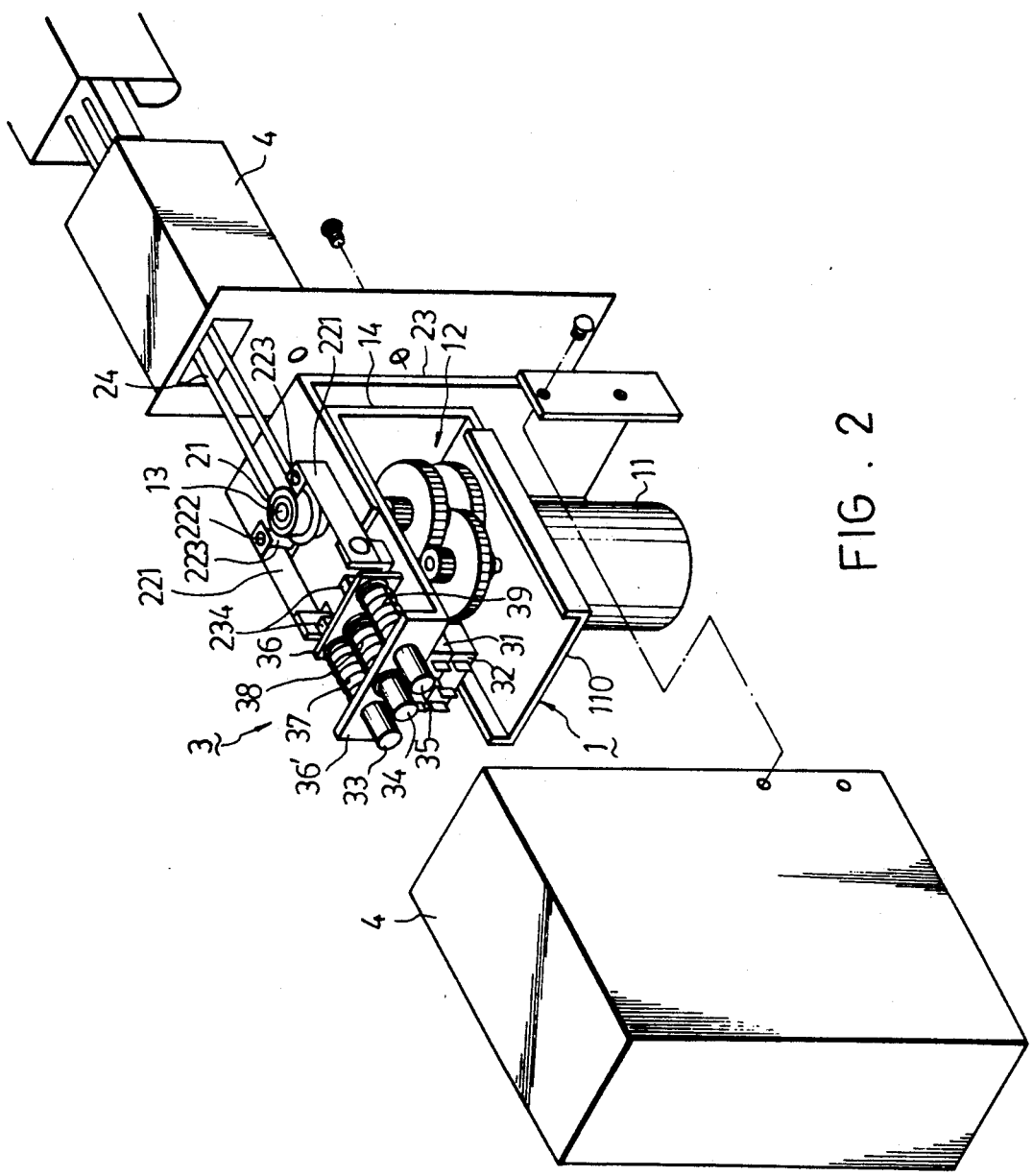
FIG. 2 is a perspective, schematic view of the electrically operated driving shaft control device of FIG. 1 after being assembled.
Figure 3:
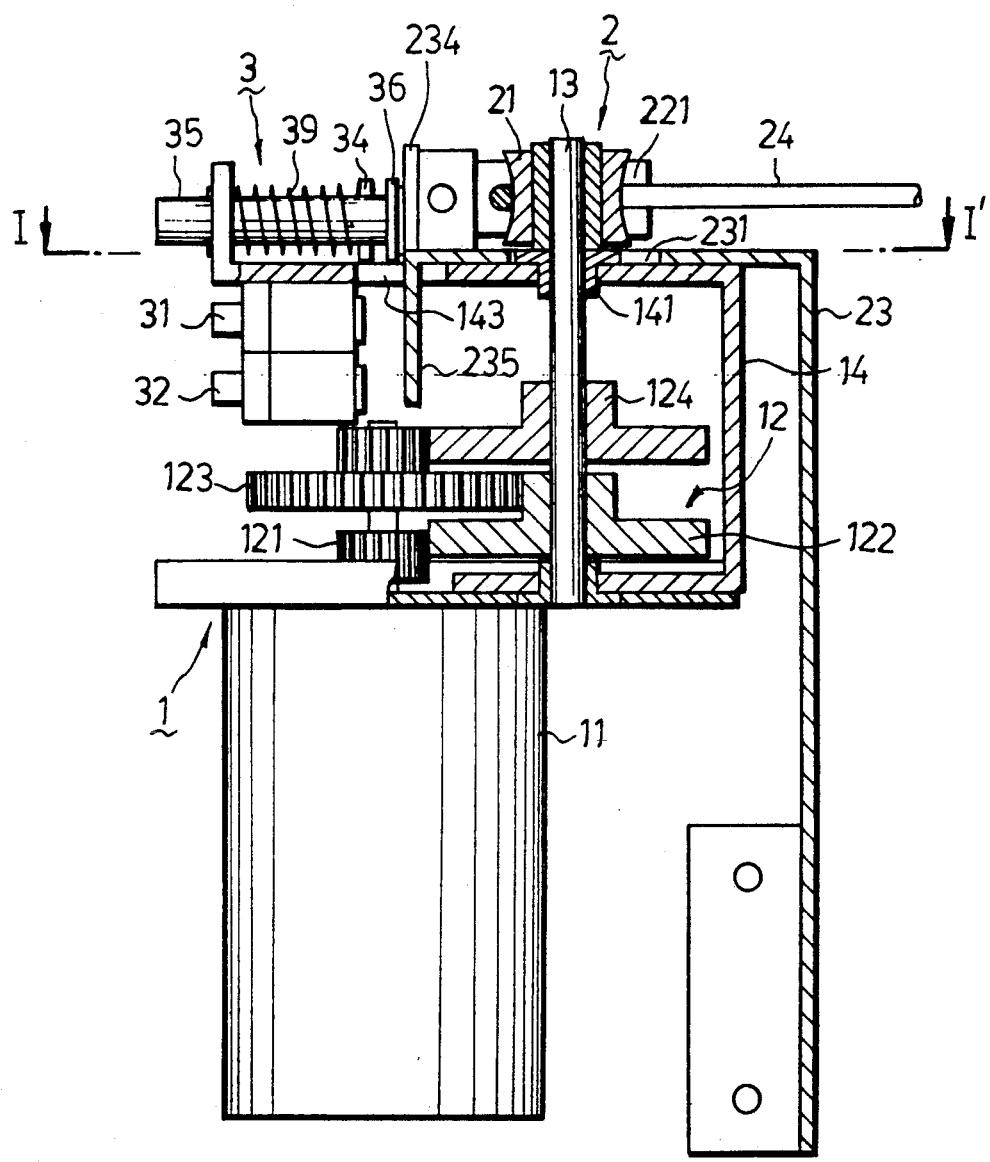
FIG. 3 is a side view of the electrically operated driving shaft control device of FIG. 2.
Figure 4:
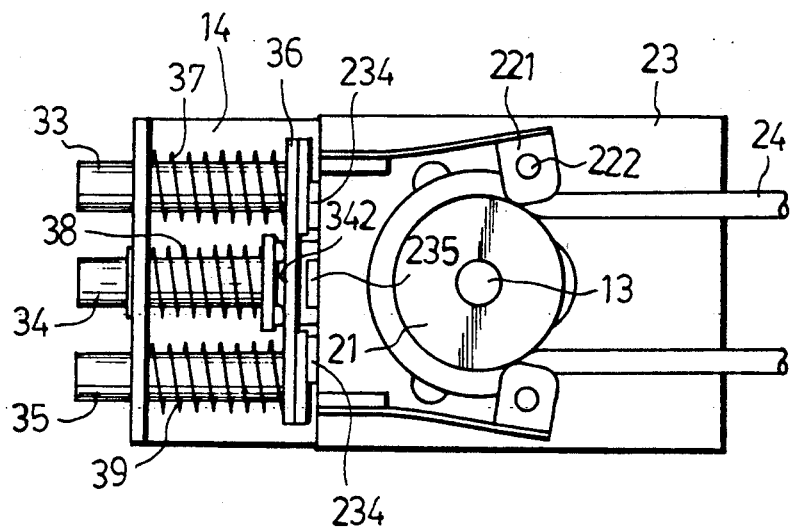
FIG. 4 is a top view of the electrically operated driving shaft control device of FIG. 2.
Figure 5:
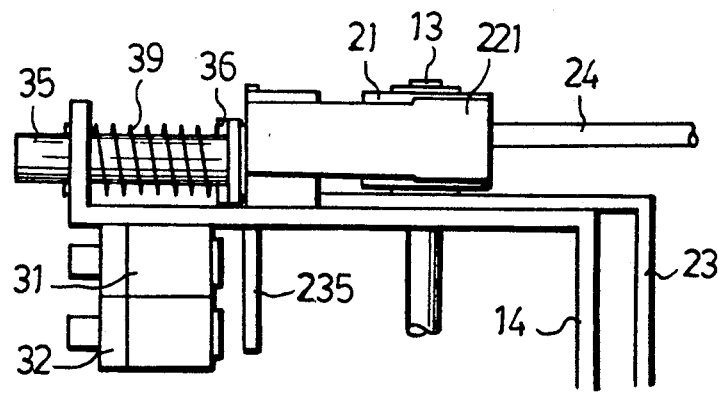
FIG. 5 is a fragmentary enlarged view of FIG. 3.
Figure 6:
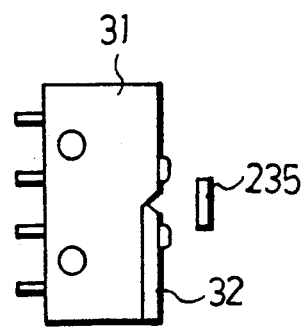
FIG. 6 is a fragmentary enlarged view of FIG. 5 before operation.

Referring to FIGS. 1 and 2, an electrically operated driving shaft control device of the present invention is shown to comprise a support member (1) having a driving shaft (13) vertically journalled in said support member (1), a driving means (11) connected to the driving shaft (13) via a gear assembly (12) for rotating the driving shaft (13), a rope assembly (2) and a stationary support.

The support member 1 includes a U-shaped frame having a lower plate member (110) on which a gear assembly (12) can be mounted by a known conventional method and an upper plate member (14) having a first end with a projecting plate (36') extending upward and a second end connected to the lower plate (110) by an intermediate plate as shown in FIG. 1. The upper plate member (14) has a bearing seat (141) and a pair of first oval-shaped openings (142) substantially aligned with the projecting plate (36') on both sides of the bearing seat (141) and a plurality of microswitch assemblies (31,32) one on top of the other formed underneath the upper plate member (14) adjacent to the first end thereof. A rectangular opening (143) is cut through the upper plate member (14) between the first end and the bearing seat (141). The projection plate (36') has three holes formed therethrough.

The stationary support has a lower portion fixed in the casing (4) and an upper portion which has a second plate member (23). The second plate member (23) is provided on top of the upper plate member (14) and includes a free end distal from the projection plate (36'). The second plate member (23) has a second oval-shaped opening (231) and two threaded openings (232) aligned with the first oval-shaped openings (142) o the upper plate member (14) on both sides of the second oval-shaped opening (231). The free end of the second plate member (23) has two upward projections (234) and a downward projecting rod (235) extending through the rectangular opening (143) of the upper plate member (14) and aligned with the switch assemblies (31,32). It is important to note that the rectangular opening (143) is bigger in size than the downward projecting rod (235).

The driving shaft (13) is connected to the driving means (11) via the gear assembly (12). One end of the driving shaft (13) passes through the bearing seat (141) of the upper plate (14) and the second oval- o shaped opening (231) of the second plate member (23). A guiding roller (21) with a circumferential recess thereon, is fixed to the driving shaft (13) on the second plate member (23). A D/C motor is used in this invention in order to occupy less space compared to the conventional control device.

A pair of resilient plates (221), each has a roller (223) at one end and another end connected to a the free end of the second plate member (23) in such a manner that the roller (223) biases against the guiding roller (21).

A rope (24) frictionally engages in the circumferential recess of the guiding roller (21) and has two end portions each passing through one of the rollers (223) and the guiding roller (21) to attach to the window blind by a known related art so as to raise or lower the blind when the driving shaft (13) is rotated by the driving means (11). A partition plate (36) having two holes each at the extreme end thereof, is provided at the free end of the second plate member (23).

Figure 7:
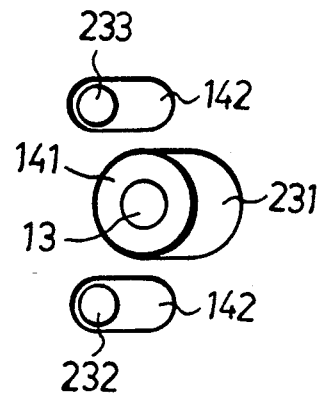
FIG. 7 is a cross sectional view of FIG. 3 taken along I—I'.

A pair of engaging screws (233) each passes through the first oval-shaped openings (142) of the upper plate member (14) and the threaded holes (232) of the second plate member (23) to engage the plates together, please see in FIG. 7. It is obvious from the illustration that the engaging screws (233) and driving shaft (13) are slightly movable in their respective openings.

A first pin member (34) with a compression spring (39) therearound and an annular recess thereon, is inserted through an intermediate hole of the three holes of the projecting plate (36'), and an E-shaped ring (341) is provided in the annular recess of the first pin member (34). So, the first pin member will not disengage from the projecting plate (36') and simultaneously abuts the head of the first pin (34) and the projecting plate (36), keeping said first pin at a predetermined distance.

A pair of second pins (33,35) respectively passes through the holes of the partition and projecting plates (36,36'), each with a compression spring (37, 38) therearound, and has two ends abutting the partition plate and the projecting plate in such a manner that the partition plate (36) is pressed against the two upward spaced projections (234) with a clearance being formed between the head of the first pin (34) and the partition plate (36).

The electrically operated driving shaft control device of the present invention also includes a sensing means (not shown) fixed in the casing (4) to monitor a predetermined tension of one end portion (24a, 24b) of the rope (24) when in use.

Figure 8:
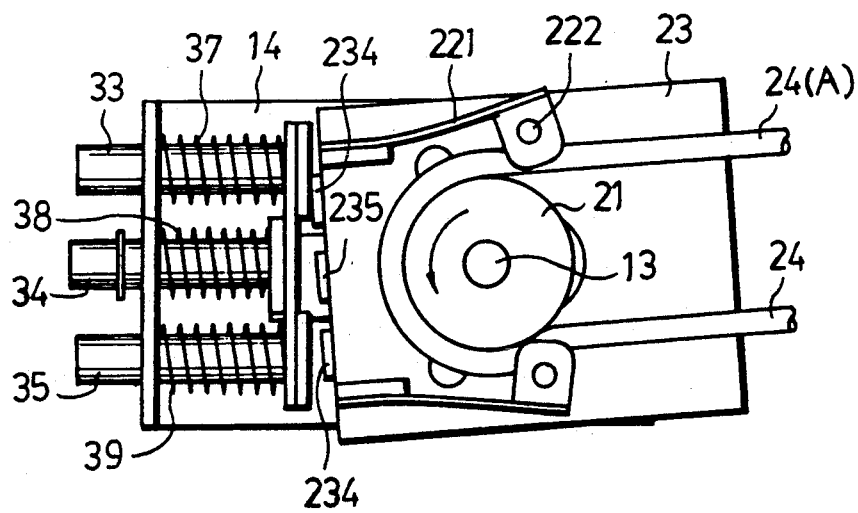
FIG. 8 illustrates a top view of the electrically operated driving shaft control device of the present invention during operation.
Figure 9:
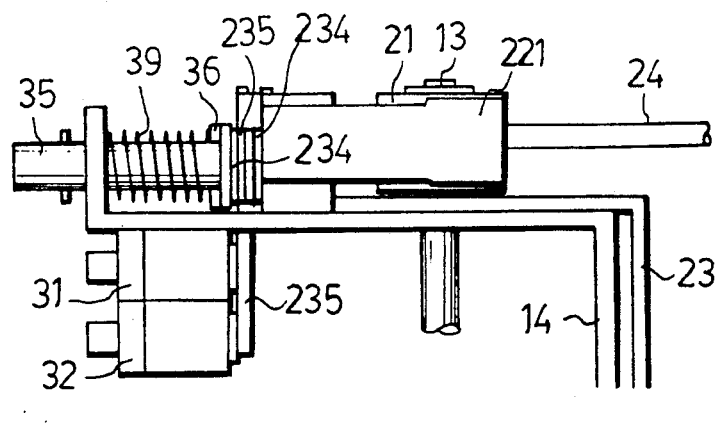
FIG. 9 illustrates a side view of the electrically operated driving shaft control device of the present invention during operation.
Figure 10:
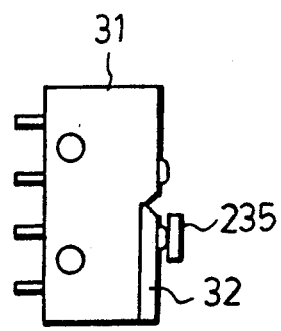
FIG. 10 illustrates a fragmentary view of FIG. 3 during operation.

When the driving means is actuated, the driving shaft (13) will rotate and correspondingly permitting the rope (24) to pass around the guiding roller (21). Upon rotating for a certain time, i.e on completion of roll up operation or roll down operation, a tension occurs at one end portion of the rope (24) between the roller (223) and the guiding roller (21) which tends to a direction against the rotation direction the guiding roller (21), please see in FIG. 8. At this time the end portion (24a) of the rope (24) is straighten, pulling the projecting plate (36') towards the partition plate (36) so that the downward projecting rod (235) touches the switch assemblies (31,32), as shown in FIG. 9. This contact switches off the connection between a terminal and the driving means (11).

Figure 11:
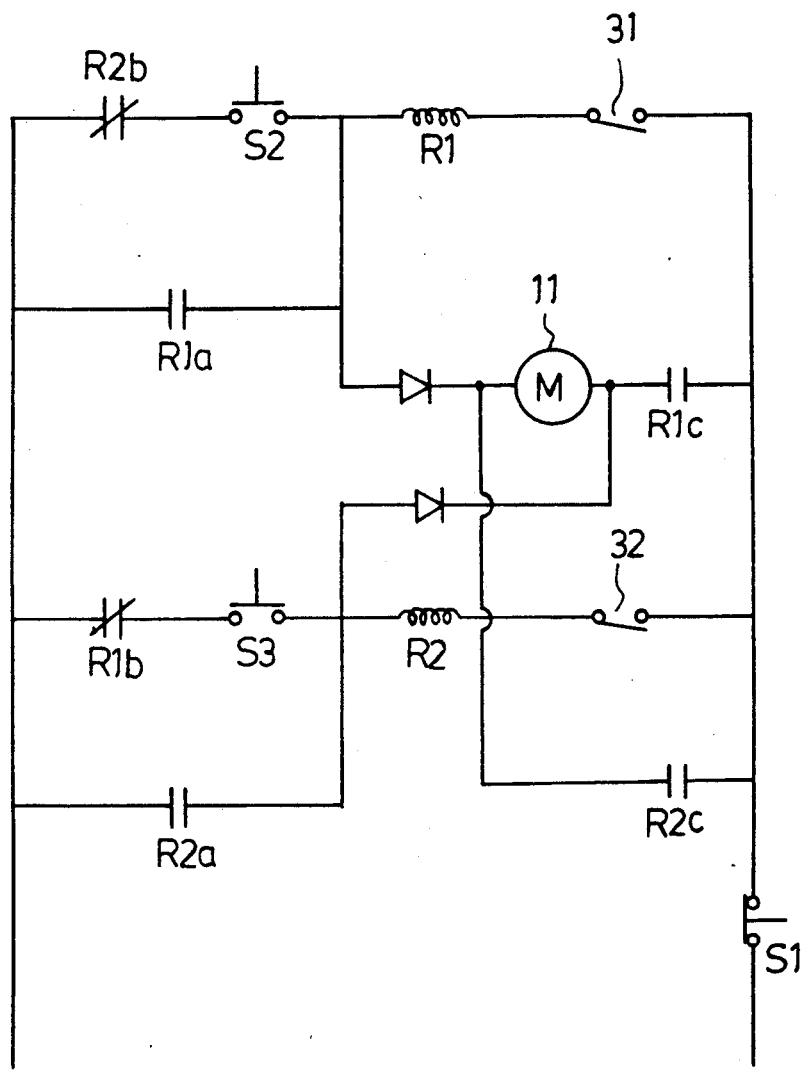
FIG. 11 is a circuit diagram of the present invention.

FIG. 11 shows a circuit diagram of the driving shaft control device of the present invention. As illustrated, it is obvious to those skilled in the art that the circuit diagram includes a first switch (S1), an on-switch (S2), an off-switch (S3), two electric relays (R1, R2), two micro switches (31,32) and a plurality of terminals (R1a, R1b, R1c). When the on-switch (S2) is pressed, the terminal (R1a, R1b, R1c) will actuate the driving motor (11) to rotate in a clockwise or anti-clockwise direction. Upon completion of rolling up or lowering down of the blind and when the end portion of the rope reaches a predetermined tension, the micro-switches (31,32) will be actuated thereby stopping the driving motor (11) through the relay (R1,R2).

During the rotation of the driving shaft (13), if the first switch (S1) is pressed, the motor (11) is disconnected from the ground thereby stopping the operation.

With the invention thus explained, it is obvious to those skilled in the art that various modifications and variation can be made without departing from the scope and spirit of the present invention. It is therefore intended that this invention be limited only as in the appended claims.

I claim:

1. An electrically operated driving shaft control device for a window blind, comprising:

a casing having a driving shaft vertically journalled in said casing;

means for rotating said driving shaft;

a plate member provided in said casing and having a top and bottom side, a front end with a projecting plate extending upward therefrom and a rear end, said plate member having a bearing seat formed on said top side and a pair of first oval-shaped openings substantially aligned with said projecting plate on both sides of said bearing seat, said projecting plate having at least three holes formed therethrough, and a micro-switch assembly being attached to said bottom side of said plate member adjacent to said front end thereof, said plate member having an opening formed between said projecting plate and said bearing seat;

a stationary plate provided on said plate member and having a front end spaced from said projecting plate of said plate member and a rear end fixed to said casing, said front end having two upward spaced projections and a downward projecting rod extending through said opening of said plate member and vertically aligned with said micro-switch assembly, said opening of said plate member being bigger than said downward projecting rod permitting said projecting rod to move within said opening, said stationary plate having a second oval-shaped opening bigger than said bearing seat and two threaded holes smaller than and substantially aligned with said pair of first oval- o shaped openings of said plate member on both sides of said second oval-shaped opening;

a pair of engaging screws passing through said first oval-shaped openings of said plate member and said two threaded, holes, of said stationary plate to engage said plate member and said stationary plate, said driving shaft passing through said bearing seat of said plate member and said second oval-shaped opening of said stationary plate;

a guiding roller fixed to said driving shaft on said stationary plate;

a pair of resilient plates each having a roller at one end and another end attached to said front end of said stationary plate with said rollers biasing said guiding roller;

a rope provided frictionally around said guiding roller and having two end portions each passing through one of said rollers and said guiding roller to attach said window blind, said guiding roller having means for guiding said rope therearound and said driving shaft being movable in said second oval-shaped opening of said stationary plate when said rope being rotated by said driving shaft;

a partition plate provided between said front end of said stationary plate and said projecting plate adjacent to said two upward spaced projections and having a pair of holes therethrough respectively aligned with two outer holes of said three holes on said projecting plate;

a pair of first pins each with a head respectively passing through said pair of holes of said partition plate and said two outer holes of said projecting plate and a first compression spring sleeved therearound, two ends of said first compressing spring abutting said projecting plate and said partition plate in such a manner that said partition plate being pressed against said two upward spaced projections and a second pin including a head and having a second compression spring sleeved, therearound, inserted through the intermediate hole of said three holes on said projecting plate abutting said projecting plate and said head of said second pin;

means for preventing said second pin disengaging from and keeping said projecting plate at a predetermined distance away from said head of said second pin with a clearance being formed between said head and said partition plate; and means for turning off said driving means upon reaching a predetermined tension at one end portion of said rope due to the rotation of said driving shaft, said predetermined tension pulling said driving shaft in said second oval-shaped opening, moving said rear end of said plate member towards said rear end of said stationary plate so that said microswitch assembly contacts with said downward projecting rod of said stationary plate.

* * * * *